United States Patent [19]

Bickler

[11] Patent Number: 4,840,394

[45] Date of Patent: Jun. 20, 1989

[54] ARTICULATED SUSPENSION SYSTEM

[75] Inventor: Donald B. Bickler, Temple City, Calif.

[73] Assignee: The United States of America as represented by the Administrator of the National Aeronautics and Space Administration, Washington, D.C.

[21] Appl. No.: 184,236

[22] Filed: Apr. 21, 1988

[51] Int. Cl.$^4$ ............................................. B62D 21/00
[52] U.S. Cl. ..................................... 280/677; 280/682
[58] Field of Search ............... 280/104, 676, 677, 682; 180/24.02

[56] References Cited

U.S. PATENT DOCUMENTS

| | | | |
|---|---|---|---|
| 838,343 | 12/1906 | Lindecker | 280/104 |
| 3,313,555 | 4/1967 | Reimer | 280/104 |
| 3,471,166 | 10/1969 | Clark | 280/676 |
| 3,473,820 | 10/1969 | Chaney | 280/676 |
| 3,756,619 | 9/1973 | Thorsell | 280/104 |
| 3,809,004 | 5/1974 | Leonheart | 115/1 R |
| 3,917,306 | 11/1975 | Madler et al. | 280/104 |
| 4,056,158 | 11/1977 | Ross | 180/6.48 |
| 4,227,711 | 10/1980 | Wheeler | 280/677 |

FOREIGN PATENT DOCUMENTS

| | | | |
|---|---|---|---|
| 2256934 | 11/1972 | Fed. Rep. of Germany | 280/677 |
| 382354 | 9/1907 | France. | |
| 517078 | 6/1920 | France. | |
| 58-4675 | 1/1983 | Japan. | |

Primary Examiner—Charles A. Marmor
Assistant Examiner—Ross Weaver
Attorney, Agent, or Firm—Thomas H. Jones; John R. Manning; Charles E. B. Glenn

[57] ABSTRACT

A vehicle is provided which maintains a substantially constant weight, and therefore traction, on all wheels, despite one wheel moving considerably higher or lower than the others, while avoiding a very soft spring suspension. The vehicle includes a chassis or body to be supported and a pair of side suspensions at either side of the body. In a six wheel vehicle, each side suspension includes a middle wheel, and front and rear linkages repectively coupling the front and rear wheels to the middle wheel. A body link pivotally connects the front and rear linkages together, with the middle of the body link rising or falling by only a fraction of the rise or fall of any of the three wheels. The body link pivotally supports the middle of the length of the body. A transverse suspension for suspending the end of the body on the side suspensions includes a middle part pivotally connected to the body about a longitudinal axis and opposite ends each pivotally connected to one of the side suspensions along at least a longitudinal axis.

4 Claims, 2 Drawing Sheets

FIG. 3
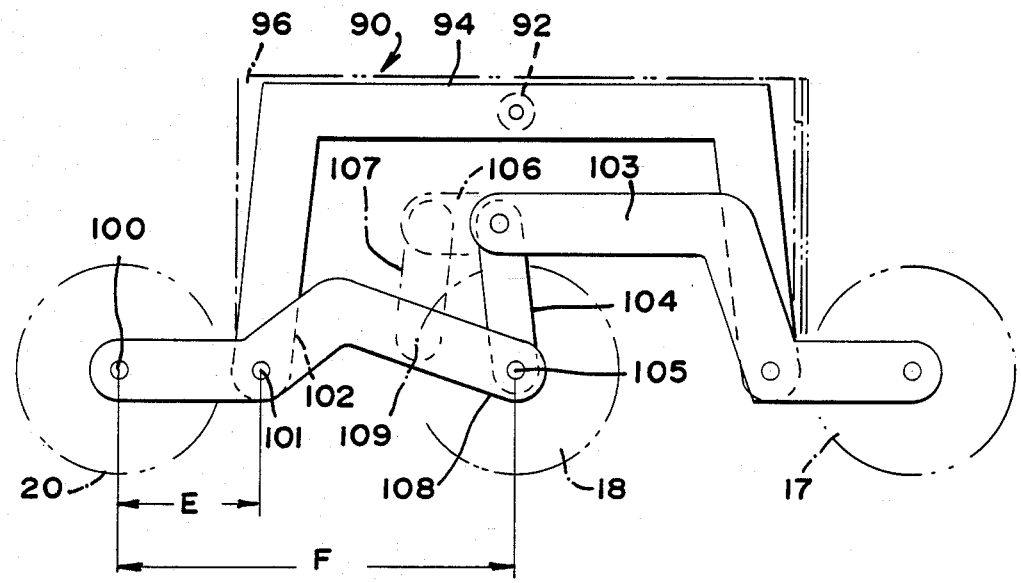
FIG. 4
FIG. 5
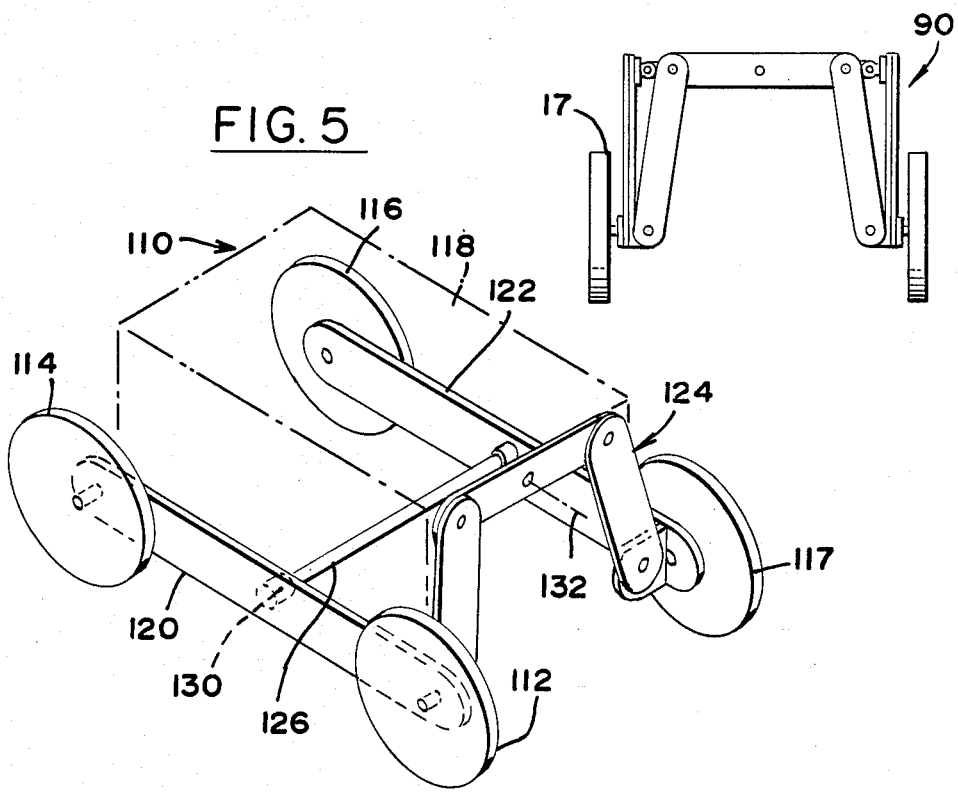

ARTICULATED SUSPENSION SYSTEM

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

The invention relates to rough terrain wheeled vehicles.

BACKGROUND ART

There are considerable uses for wheeled vehicles that can move over very uneven terrain. Commonly available suspension systems greatly reduce the weight, and therefore the traction on wheels that are extended to lie below the level of the other wheels, and greatly increase the weight and traction of any one raised wheel. If a "stiff" suspension system is used, the chassis or body carried by the suspension system is considerably deflected when any one of the wheels is deflected. A reduction of weight shift to an extended or retracted wheel and the reduction of body movement can be achieved by using low rate (soft) springs to support the body on the wheels. However, this approach results in an undesirable low oscillation frequency, usually referred to as "too soft" a suspension. A vehicle which caused deflection of the body by mechanically "averaging" the wheel deflection, while maintaining the wheel load distribution substantially constant, all while avoiding a "soft" suspension having a low oscillation frequency, would be of considerable value.

STATEMENT OF THE INVENTION

It is an object of the invention to provide a rough terrain vehicle which maintains substantially constant loads on all wheels.

In accordance with one embodiment of the present invention, a wheeled vehicle is provided which maintains wheel load distribution substantially constant and mechanically averages deflection of the body, while enabling a unitary body to be used with a stiff suspension. A pair of side suspensions lie at either side of the body and a transverse suspension couples the side suspensions to the body. The transverse suspension may include a transverse suspension linkage extending across the width of the vehicle with opposite sides pivotally connected to the side suspensions and a middle pivotally connected to the middle of the body width near an end of the body. The transverse suspension can also include another transverse suspension linkage coupled to a location near the middle of the length of the body.

In a six wheel vehicle, each side suspension can include three wheels arranged in tandem, a front linkage extending between the front and middle wheels, and a rear linkage extending between the rear and middle wheels, with the front and rear linkages pivotally coupled near the middle wheel. Each side suspension also includes a body link having opposite ends pivotally connected to the front and rear linkages, the middle of the body link being coupled to the body to support it.

The novel features of the invention are set forth with particularity in the appended claims. The invention will be best understood from the following description when read in conjunction with the accompanying drawings.

BRIEF DESCRIPTION OF THE DRAWINGS

FIG. 3 is a side elevational view of a vehicle similar to that of FIG. 1.

FIG. 4 is a front elevational view of the vehicle of FIG. 3.

FIG. 5 is a perspective skeleton view of a four wheel vehicle constructed in accordance with another embodiment of the present invention.

DETAILED DESCRIPTION OF THE INVENTION

Figure 1:
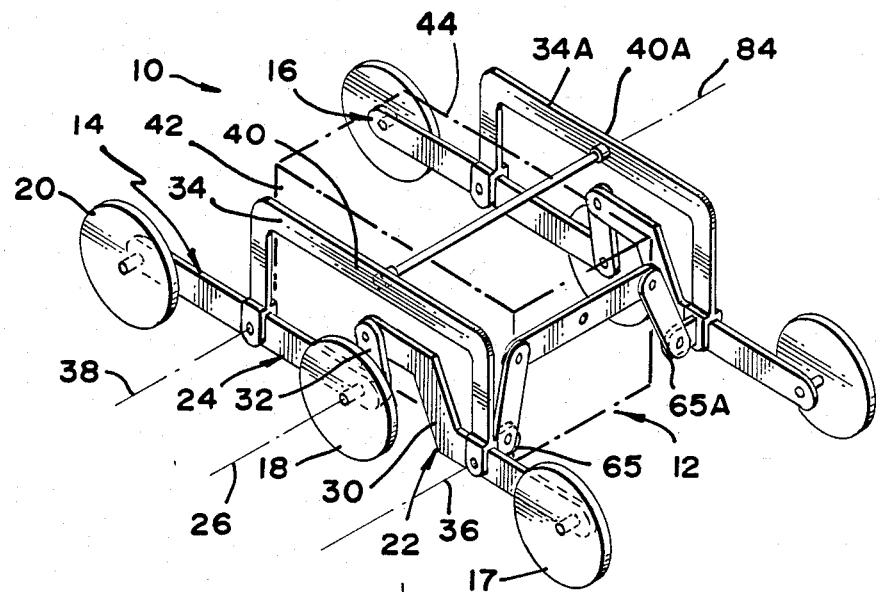
FIG. 1 is a perspective skeleton view of a six wheel vehicle constructed in accordance with the present invention, with all wheels lying at the same level.

FIG. 1 illustrates a vehicle 10 which includes a body 12 and a pair of substantially identical side suspensions 14, 16 that lie at either side of the body and that support the body on the ground. Each side suspension such as 14 includes a front end wheel 17, a middle wheel 18, and a rear end wheel 20, all wheels being intended to roll on the ground and rollably support the weight of the vehicle. A front linkage 22 extends between the front and middle wheels and is rotatably coupled to them. A rear linkage 24 extends between the rear and middle wheels and is rotatably coupled to them. The front and rear linkages are pivotally connected to each other about a transverse axis 26 about which the middle wheel rolls. The rear linkage 24 is formed from a single first bogie link. The front linkage 22 is formed from a second bogie link 30 and a short offset link 32. A body link 34 extends between the front and rear linkages and is pivotally connected to them about transverse axes 36, 38.

The body link 34 has a middle 40 which is coupled to the middle of the length of the body (between its front and rear ends) at one side 42 thereof to support that location at that side of the body. The opposite side 44 of the body is similarly supported at the middle 40A of the other body link 34A. The coupling locations are preferably near the center of gravity of the body along its length.

Figure 2:
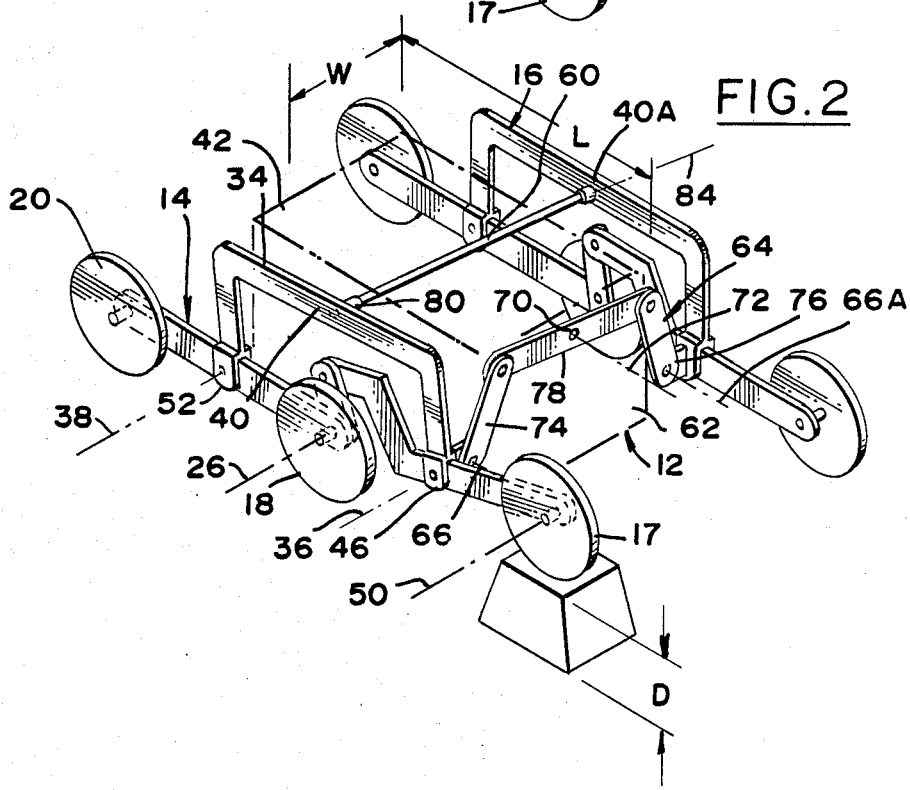
FIG. 2 is a view similar to that of FIG. 1 but with one of the wheels deflected above the others.

When one of the wheels on a side suspension moves vertically, the middle 40 of the body link at that side moves vertically by only a fraction of the wheel movement. FIG. 2 illustrates the situation where one of the wheels 17 has moved up by a predetermined distance D. The forward end 46 of the body link moves up by only a fraction of D, the fraction depending primarily on the ratio of distances between the axis 36 and the front and middle wheel axes 50, 26. The middle 40 of the body link moves up by only about half the distance that its front end 46 moves. Similarly, when the rear wheel 20 deflects vertically, the rear end 52 of the body link moves vertically by a fraction of the rear wheel movement and the middle 40 of the body link moves only about half that of its rear end 52. In a somewhat similar manner, when the middle wheel 18 moves vertically, it moves each end 46, 52 of the body link by a fraction of the middle wheel movement, and the middle 40 of the body link will move accordingly. Of course, only one side such as 42 of the body will be moved vertically by the middle 40 of the body link. With a proper positioning of the pivot axes, the middle 40, 40A of each body link 34, 34A will move vertically by only about one third the vertical deflection of any of its wheels. Also, a location 60 along the middle of the width W of the body and near the middle of the length L of the body where it connects to the middle of the body links, will move vertically by about one sixth the deflection of any one of the six wheels.

The forward end 62 of the body is supported on the side linkages through a first transverse suspension linkage 64. The transverse suspension linkage 64 has opposite sides that are each pivotally connected to a different one of the side suspensions 14, 16 about a universal joint 65, 65A (FIG. 1) that permits pivoting about longitudinal axes 66, 66A (FIG. 2) and transverse axes that are substantially coincident with axis 36. The first transverse linkage has a middle 70 lying halfway between the side suspensions and pivotally connected to the body at a longitudinal axis 72. The first transverse suspension linkage 64 is formed by three links, including a pair of end cross links 74, 76 having inner ends pivotally coupled (each about two axes) to the side suspension, and an intermediate cross link 78 pivotally connected (about two axes parallel to 66 and 36) to the outer ends of the end cross links 74, 76 and pivotally connected at 72 to the body. The three linkages permit the spacing between the side suspensions to be constant despite the front end of one of the side suspensions moving vertically with respect to the other. The joint 80 (FIG. 1) where the middle 40 of a body link is connected to one side of the body, near the middle of the body length, forms a second transverse suspension. The joint 80 allows pivoting about a transverse axis 84.

FIG. 3 is a side elevation view of a vehicle 90 similar to that of FIGS. 1 and 2, constructed so that the joint 92 where the middle of the body link 94 connects to the body 96, moves vertically by one third of the distance that any of the wheels 17, 18, 20 move. To accomplish this, the horizontal distance E between the transverse axis 100 of an end wheel and the transverse axis 101 at an end 102 of the body link is made less than half the distance F between the middle end and wheel axes. The distance E is preferably about one third of F. While the front bogie link 103 and offset link 104 can be as shown in solid lines to couple to the rear bogie link at the middle wheel axis 105, it is also possible to form these links as shown at 106, 107 to couple to the rear bogie link 108 at an axis 109 lying rearward of the middle wheel axis 105.

FIG. 5 illustrates another vehicle 110 which has only four wheels 112–117 for supporting a body 118. Each side suspension 120, 122 consists of a simple link extending between the front and rear wheels. However, a first transverse suspension linkage 124 which connects ends of the side suspensions to an end of the body, and a second transverse suspension linkage 126 which connects the middle of the side suspensions to the middle of the body, are similar to the embodiments of the invention of FIGS. 1–4. Any vertical movement of a wheel such as 112 causes half the vertical movement at a joint 130 where the side suspension couples to one side of the body. Such vertical movemetn of a wheel 112 causes half the vertical movement of an axis at 132 where the first transverse suspension linkage couples to an end of the body at the middle of the width of the body. The load carried by any of the wheels remains substantially constant despite any of the wheels moving vertically with respect to the other wheels.

In an actual vehicle, springs are generally desirable to isolate the body from shocks when one of the wheels suddenly rises or falls. This can be accomplished by using springs to couple the body to each suspension system and springs or the like along each suspension system. However, low rate springs are not required to maintain substantially equal loads on the wheels. The wheels can be driven by motors each attached to a different wheel, or by an engine coupled through a transmission to certain of the wheels.

Thus, the invention provides vehicles which maintain substantially constant loads on the wheels despite their vertical deflection, without requiring the use of a soft spring suspension and the consequent low frequency vibrations of the body, and moves the body vertically by averages of wheel deflections. In a six wheel vehicle each side suspension includes independently pivotal front and rear linkages each coupling the middle wheel to a different end wheel, and a body link having opposite ends pivotally connected to the front and rear linkages and a middle coupled to the body. An end of the side suspensions can be coupled to an end of the body by a transverse suspension linkage which includes a middle coupled to the body near the middle of its width along a longitudinal axis, and having opposite ends pivotally coupled to the side linkages.

Although particular embodiments of the invention have been described and illustrated herein, it is recognized that modifications and variations may readily occur to those skilled in the art and consequently it is intended to cover such modifications and equivalents.

I claim:

1. A vehicle moveable along the ground comprising:
   a body having a width extending in a predetermined transverse direction;
   a pair of side suspensions lying at either side of said body;
   each side suspension including a pair of end wheels rotatable about transverse axes including a front wheel and a rear wheel, a middle wheel rotatable about a transverse axis, a rear linkage extending between said rear and middle wheels, a front linkage extending between said front wheel and said rear linkage, and a body link having front and rear ends pivotally connected respectively to said front and rear linkages;
   one of said linkages of each side suspension including a first bogie link having opposite ends coupled to said middle wheel and one of said end wheels, and the other of said linkages including a second bogie link having a first end coupled to the other one of said end wheels and a second end and also including means coupling the second end of the second bogie link to the first bogie link which allows the second end of the second bogie link to pivot about a transverse axis and move forward and rearward; and
   a transverse suspension for coupling said side suspensions to said body including an intermediate cross link having a middle pivotally coupled to said body about a longitudinal axis extending in a direction substantially perpendicular to said transverse axes and having a pair of ends, and a pair of end cross links each having an inner end pivotally connected to an end of said intermediate cross link and an outer end pivotally connected to an end of said body link.

2. The vehicle described in claim 1 wherein:
   said coupling means includes an offset link that is shorter than said second bogie link and that has primarily vertically-spaced opposite ends pivotally connected respectively to said first and second bogie links.

3. A vehicle moveable along the ground, comprising:

a body having a width extending in a transverse direction and a length extending in a longitudinal direction;

a pair of side suspensions at either side of said body, and a transverse suspension coupling said side suspensions to said body;

each side suspension including a pair of end wheels including a front wheel and a rear wheel, a middle wheel, a first bogie link having opposite ends pivotally coupled to one of said end wheels and to said middle wheel, a second bogie link having one end pivotally connected to the other one of said end wheels and another end coupled to said first bogie link to allow pivoting and front-and-rear movement of said another end of said second bogie link, and a body link having front and rear ends pivotally connected respectively to said first and second bogie links;

said transverse suspension including an intermediate cross link having a middle pivotally coupled to said body and opposite ends, and a pair of end cross links each having one end pivotally coupled to an end of said intermediate cross link and another end pivotally coupled to a side suspension substantially at the location where an end of said body link is connected to a bogie link.

4. The vehicle described in claim 3 wherein:

each of said body links has a middle, and said transverse suspension also includes a pair of joints each pivotally coupling the middle of a body link to said body;

said body having a center of gravity and said joints lying on an axis passing substantially through said center of gravity.

* * * * *